United States Patent
Taylor-Tibbott (10) Patent No.: US 10,018,121 B2
(45) Date of Patent: Jul. 10, 2018

(54) FLOW OUTLET

(71) Applicant: ROLLS-ROYCE PLC, London (GB)

(72) Inventor: Oliver C Taylor-Tibbott, Lichfield (GB)

(73) Assignee: ROLLS-ROYCE plc, London (GB)

(*) Notice: Subject to any disclaimer, the term of this patent is extended or adjusted under 35 U.S.C. 154(b) by 728 days.

(21) Appl. No.: 14/563,491

(22) Filed: Dec. 8, 2014

(65) Prior Publication Data

US 2015/0176500 A1    Jun. 25, 2015

(30) Foreign Application Priority Data

Dec. 23, 2013  (GB) .................................. 1322833.3

(51) Int. Cl.
| | | |
|---|---|---|
| *F02C 9/18* | (2006.01) | |
| *F01D 17/10* | (2006.01) | |
| *F02K 1/38* | (2006.01) | |
| *F02K 3/075* | (2006.01) | |
| *B33Y 10/00* | (2015.01) | |

(52) U.S. Cl.
CPC .............. *F02C 9/18* (2013.01); *B33Y 10/00* (2014.12); *F01D 17/105* (2013.01); *F02K 1/386* (2013.01); *F02K 3/075* (2013.01); *F05D 2230/30* (2013.01); *F05D 2250/314* (2013.01); *F05D 2260/2212* (2013.01); *F05D 2270/3032* (2013.01); *Y02T 50/676* (2013.01); *Y10T 29/49428* (2015.01)

(58) Field of Classification Search
CPC ............... F02C 6/18; F02C 9/18; F02K 1/386
See application file for complete search history.

(56) References Cited

U.S. PATENT DOCUMENTS

| | | | |
|---|---|---|---|
| 7,946,104 B2* | 5/2011 | Frank | F01D 17/105 60/226.1 |
| 8,336,316 B2 | 12/2012 | Kirby | |
| 2003/0068223 A1 | 4/2003 | Nikkanen et al. | |
| 2007/0086885 A1 | 4/2007 | Appleby et al. | |
| 2008/0016878 A1 | 1/2008 | Kirby | |

(Continued)

FOREIGN PATENT DOCUMENTS

| | | |
|---|---|---|
| EP | 2 184 447 A2 | 5/2010 |
| GB | 2 132 269 A | 7/1984 |

OTHER PUBLICATIONS

May 28, 2015 Search Report issued in European Patent Application No. 14 19 6866.

(Continued)

*Primary Examiner* — Craig Kim
(74) *Attorney, Agent, or Firm* — Oliff PLC (57) ABSTRACT

A bleed flow discharge device for discharging bleed flow into a main fluid flow. The bleed flow discharge device has an outlet panel that comprises distinct first and second regions, both of which have bleed flow exit passages. The first region is at the downstream end of the bleed flow outlet panel relative to the main flow. The exit passages in the first region are closely aligned to a major axis of the outlet panel, whereas the exit passages in the second region have a component that points towards a perimeter edge of the exit panel. This arrangement results in good mixing of the bleed flow with the bypass flow, delayed attachment of the bleed flow onto the bypass duct surfaces, and low noise.

19 Claims, 6 Drawing Sheets

(56) References Cited

U.S. PATENT DOCUMENTS

| | | |
|---|---|---|
| 2008/0050218 A1 | 2/2008 | Sokhey |
| 2008/0053105 A1* | 3/2008 | Appleby .................. F02C 6/08 |
| | | 60/785 |
| 2009/0126194 A1 | 5/2009 | Appleby et al. |
| 2009/0188257 A1 | 7/2009 | Kirby |
| 2010/0043447 A1 | 2/2010 | Kirby |
| 2010/0115963 A1* | 5/2010 | Kirby ................... F01D 17/105 |
| | | 60/785 |
| 2011/0167834 A1 | 7/2011 | Britchford et al. |
| 2012/0067061 A1* | 3/2012 | Wright .................... F16F 5/00 |
| | | 60/785 |
| 2013/0269366 A1 | 10/2013 | Haugen et al. |

OTHER PUBLICATIONS

United Kingdom Search Report issued in GB1322833.3 dated Aug. 13, 2014.

\* cited by examiner

FLOW OUTLET

CROSS-REFERENCE TO RELATED APPLICATIONS

This application is based upon and claims the benefit of priority from British Patent Application Number 1322833.3 filed 23 Dec. 2013, the entire contents of which are incorporated by reference.

BACKGROUND

1. Field of the Disclosure

This disclosure relates to a flow discharge device and an outlet for a flow discharge device. The disclosure may be concerned with such an outlet for discharging compressor bleed air into a bypass duct of a gas turbine engine.

2. Description of the Related Art

Figure 1:
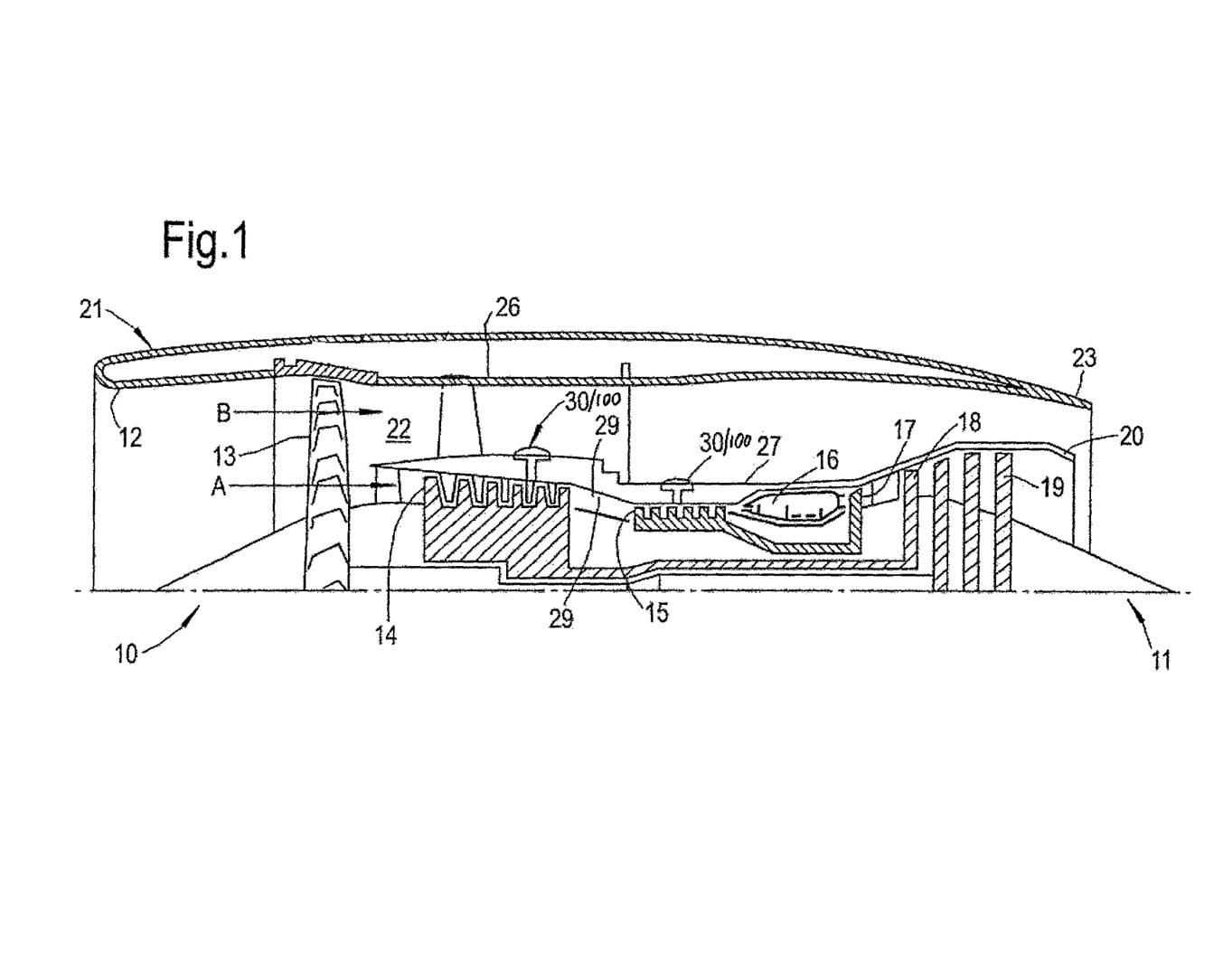
FIG. 1 is a schematic sectional view of a gas turbine engine.

Referring to FIG. 1, a ducted fan (or turbofan) gas turbine engine (e.g. a jet engine) generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and a core exhaust nozzle 20. A nacelle 21 generally surrounds the engine 10 and defines the intake 12, a bypass duct 22 defined by an inner wall 27 and an outer wall 26, and an exhaust nozzle 23.

The gas turbine engine 10 works in the conventional manner so that air entering the intake 12 is accelerated by the fan 13 to produce two air flows: a first airflow A into the intermediate pressure compressor 14 of the engine core and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive, the high, intermediate and low pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

During engine operation and particularly when changing rotational speed at low power it is important to ensure that the pressure ratio across each compressor 14, 15 remains below a critical working point, otherwise the engine 10 can surge and flow through the engine 10 breaks down. This can cause damage to the engine's components as well as aircraft handling problems.

To maintain a preferred pressure difference across a compressor 14, 15, or even just one stage of a compressor 14, 15, bleed assemblies 30 are provided to release pressure from an upstream part of a compressor 14,15. For example, when a gas turbine engine is operating under transient conditions, e.g. when decelerating, it may be necessary to bleed air at high pressure from the core gas flow A through the engine. Operation of a bleed assembly 30 and engine operability are described in "The Jet Engine" 6th Edition, 2005, Rolls-Royce plc, pages 79-80, and details of such operation will therefore only be briefly mentioned herein.

Figure 2:
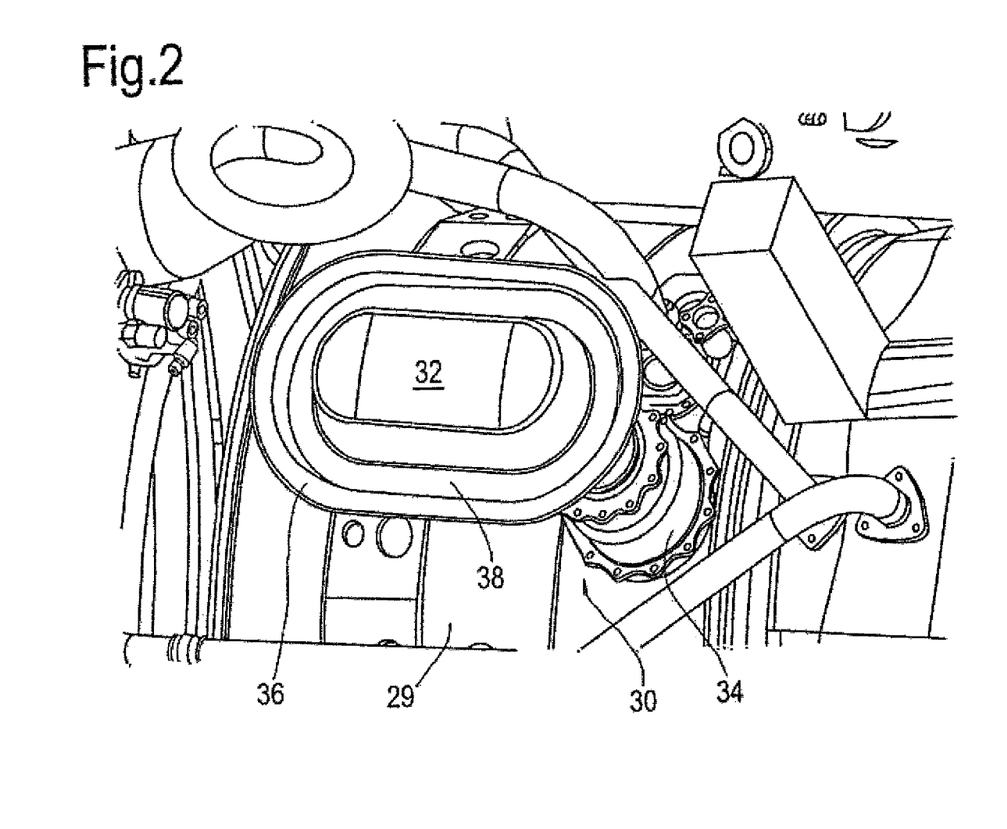
FIG. 2 is a schematic view of a bleed flow discharge device of the engine of FIG. 1.

Referring to FIG. 2, the bleed assemblies 30 may each bleed air through a discharge device 36 into the bypass flow B within the bypass duct 22. The inner wall 27 of the bypass duct (see FIG. 1) is omitted from FIG. 2, so that the compressor casing structure 29 is visible. The bleed assembly 30 comprises a bleed valve 34 which communicates at one end with the respective compressor 14, 15 and is provided at its other end with the discharge device 36. In operation of the engine shown in FIG. 1, part of the core engine air flow A may be diverted through the bleed assembly 30 by opening the bleed valve 34 so that the bleed air flow passes from the respective compressors 14, 15 to be discharged into the bypass duct 22 through the exit 32.

The discharge device 36 may have an open exit 32 that forms a jet flow that penetrates into the bypass flow B. However, such an arrangement is not particularly effective at mixing the hot flow of vent gas with the cool bypass flow, with the result that the hot gas impinges on the downstream surface of the engine casing. This can cause significant thermal damage to the structure unless it is properly protected from the heat, which can increase the weight of the engine as well as the overall cost.

In an alternative arrangement to that shown in FIG. 2, the exit 32 may comprise a so-called pepper pot that has a plurality of openings or holes through which the bleed flow passes into the bypass flow B. However, the individual flow jets from the pepper pot holes tend to coalesce into a single plume, and the bleed flow does not mix well with the main flow.

OBJECTS AND SUMMARY

Thus, regardless of whether the exit 32 is an open exit or a pepper pot exit, the bleed flow does not mix effectively with the cool bypass flow, with the result that the hot gas impinges on the downstream surface of the engine casing. A particular problem is with the hot bleed flow attaching to the inner surface 27 of the bypass duct 22 close to the bleed flow exit, and the associated thermal damage that results.

A further problem with the bleed flow plumes that are produced using conventional bleed flow outlets is that the plume creates a blockage to the main air flow B which can have an effect on the performance of the fan 13. The blockage locally increases the pressure ratio across the fan, reducing its stall margin. Thus, such a plume can create an increased likelihood that the fan will stall, a condition in which the flow across the fan breaks down and all thrust from the engine is lost.

It would therefore be advantageous to improve the mixing of the bleed flow with the bypass flow where a bleed assembly is used. It would be advantageous to improve the mixing of the bleed flow with the bypass flow without creating a high blockage at the bleed flow outlet. A high blockage at the bleed flow outlet itself would result in a larger bleed assembly being required for a given bleed flow rate, leading to the disadvantages of increased size and weight. Aspects of the present invention address at least these issues.

According to an aspect, there is provided a bleed flow outlet panel for discharging bleed flow taken from a main flow through a gas turbine engine. The bleed flow outlet panel comprises a perimeter edge formed around a major axis of the bleed flow outlet panel and defining its planform shape. The bleed flow outlet panel comprises a plurality of exit passages, the exit passages being formed in at least two distinct regions of the bleed flow outlet panel, each region comprising a plurality of adjacent exit passages. The exit passages in a first region are arranged to direct the bleed flow, in use, in a direction that is substantially aligned with the major axis of the bleed flow outlet panel. The exit passages in a second region are arranged to direct the bleed flow, in use, in a direction that, when projected onto a plane perpendicular to the major axis and containing the perimeter edge, points towards the closest point (which may be referred to as the local closest point) on the perimeter edge.

According to an aspect, there is provided a bleed flow outlet panel for discharging bleed flow taken from a main flow through a gas turbine engine. The bleed flow outlet panel comprises a perimeter edge formed around a major axis of the bleed flow outlet panel and defining its planform shape. The bleed flow outlet panel comprises a plurality of exit passages, the exit passages being formed in at least two distinct regions of the bleed flow outlet panel, each region comprising a plurality of adjacent exit passages. The exit passages in a first region are arranged to direct the bleed flow, in use, in a direction that has a greater component in the direction of the major axis than do the exit passages in the second region.

According to an aspect, there is provided a gas turbine engine comprising:
an engine core through which core flow passes in use;
a bypass duct arranged around the engine core and through which bypass flow passes in use;
a bleed valve in communication with the core flow and arranged to be selectively openable to allow bleed flow to be bled from the core flow; and
a bleed flow discharge device in communication with the bleed valve and arranged to discharge the bleed flow into the bypass flow, the bleed flow discharge device comprising:
a bleed flow duct through which, in use, the bleed flow taken from the core flow through the bleed valve passes; and
a bleed flow outlet panel through which, in use, the bleed flow passes from the bleed flow discharge device into the bypass flow. The bleed flow outlet panel may comprise:
a perimeter edge formed around a major axis of the bleed flow outlet panel and defining its planform shape; and
a plurality of exit passages, the exit passages being formed in at least two distinct regions of the bleed flow outlet panel, each region comprising a plurality of adjacent exit passages. The exit passages in a first region are arranged to direct the bleed flow, in use, in a direction that is substantially aligned with the major axis of the bleed flow outlet panel. The exit passages in a second region are arranged to direct the bleed flow, in use, in a direction that, when projected onto a plane perpendicular to the major axis and containing the perimeter edge points towards the closest point (which may be referred to as the local closest point) on the perimeter edge.

According to such arrangements, the bleed valve may be said to be in selective fluid communication with the core flow. The bleed flow discharge device may be said to be in fluid communication with the bleed valve. Together, the bleed flow discharge device and the bleed valve may be referred to as a bleed assembly.

The planform shape may be defined as the shape of the bleed flow outlet panel when viewed along its major axis. The perimeter edge may define a generally planar structure. As such, the bleed flow outlet panel may be a generally planar structure. In such examples, the exit passages in a second region may be arranged to direct the bleed flow, in use, in a direction that, when projected onto the generally planar structure points towards the closest point (which may be referred to as the local closest point) on the perimeter edge.

The bleed flow being discharged from the bleed flow outlet panel may be taken from a compressor, or a region between the compressor and a combustor of the core of a gas turbine engine, for example. The bleed flow being discharged from the bleed flow outlet panel may be discharged into a bypass duct of a gas turbine engine, for example.

Where reference is made to exit passages being arranged to direct bleed flow in a certain direction, this may mean that those exit passages may be said to point in that direction.

In use, the second region of the bleed flow outlet panel may be generally downstream of the first region relative to the direction of the flow into which the bleed flow is discharged.

The exit passages in the second region may be said to point in a direction that has a component that points away from the major axis. The exit passages in the second region may be said to point in a direction that has a component that points towards the closest point on the perimeter edge. The absolute angle of the exit passages (for example relative to each other) may vary in the second region, for example depending on the angular position around the major axis and/or the direction from a given exit to the closest position on the perimeter edge of the bleed flow outlet.

The first region may be defined by a first angular segment of the bleed flow outlet panel. The second region may be defined by a second angular segment of the bleed flow outlet panel. In this regard, an angular segment may be a segment or region of the outlet panel between two walls diverging from a central region of the outlet panel to the perimeter edge.

All of the exit passages of the bleed flow outlet panel may be formed in either the first region or the second region. Thus, each and every one of the exit passages may be formed in either the first region or the second region.

The exit passages in the second region may be arranged to direct the bleed flow, in use, in a direction that has a major component in the direction of the major axis of the bleed flow outlet panel. All exit passages (for example exit passages in both the first region and the second region) may be said to have a major component that points in the direction of the major axis. In this sense, a major component may mean, for example, that at least 50%, for example at least 60%, for example at least 70%, for example at least 80%, for example at least 90%, of the flow rate through an exit passage is in the direction of the major axis.

The bleed flow outlet panel may comprise two walls that are spaced apart from each other and separate the first region from the second region. Each wall may extend across the thickness of the bleed flow outlet panel, i.e. across the dimension that extends in the direction of the major axis. The wall may extend from the perimeter edge to an inner region or innermost extent of the bleed flow outlet panel.

The perimeter edge, and thus the plan form shape of the bleed flow outlet panel, may take any desired shape. For example, the perimeter edge of the bleed flow outlet panel may comprise a first curved portion and a second curved portion. The first curved portion and/or the second curved portion may be, for example, segments of a circle, for example semi-circular.

The perimeter edge of the bleed flow outlet panel may be an elongate shape. Such an elongate shape may have first and second curved portions joined together by a first side edge and a second side edge. The first and second side edges may be straight, or may themselves comprise a curve, or a curved portion. Purely by way of example, the perimeter edge may be a racetrack shape, an oval shape, or a rectangle with curves (such as semi-circles) at either end, or any other desired shape.

The first region may be defined at least in part by at least a part of the first curved portion (for example a part or all of the first curved portion). The first region may be defined at least in part by first and second dividing walls extending into the bleed flow outlet panel from first and second points on the first curved portion, including from first and second ends of the first curved portion.

Where the bleed flow outlet panel comprises first and second dividing walls, they may extend in a direction that is substantially perpendicular to the local perimeter edge. The first and second dividing walls may extend in a direction that is parallel to the major axis of the panel.

The second region may be defined by the first and second dividing walls, the second curved portion, the first side edge, and the second side edge in arrangements including these features. The second region may itself be split into two, three, four or more sub-regions. Such sub-regions may be formed by further dividing walls within the second region, for example, third, fourth or fifth dividing walls. Such additional dividing walls may provide structural strength and/or rigidity to the structure.

When in use, the first curved portion may be positioned at a downstream end of the panel relative to a main flow into which the bleed flow exits. When in use, the second curved portion may be positioned at an upstream end of the panel relative to a main flow into which the bleed flow exits.

The total flow area of the exit passages in the second region may be greater than the total flow area of the exit passages in the first region.

The exit passages in the second region may be said to direct the bleed flow in a direction that, when projected onto the plane of the outlet panel, is locally perpendicular to the closest point on the perimeter edge of the outlet panel (that is, perpendicular to a tangent to the closest point on the perimeter edge). Where the perimeter edge of the second region comprises a straight portion, the exit passage(s) for which the straight portion is their closest point on the perimeter edge may point in a direction that is perpendicular to that straight portion. Where the perimeter edge of the second region comprises a segment of a circle, the exit passage(s) for which the segment of the circle is their closest point on the perimeter edge may point in a direction that is along a radius of that circular portion.

The exit passages in the outlet panel may take any suitable form, for example any suitable size and/or shape. By way of example, the exit passages may be formed by vanes. Such vanes may be formed inside the perimeter edge of the outlet panel.

By way of further example, each region may comprise at least two offset walls that are offset from the perimeter edge, and each exit passage may be defined at least in part by adjacent offset walls or by the perimeter edge and the offset wall immediately adjacent the perimeter edge. The distance between an offset wall and an adjacent offset wall or perimeter edge may be constant around the entire length of the wall.

The exit passages of the first region may be arranged to direct the bleed flow within 10 degrees, for example within 5 degrees, of the major axis of the bleed flow outlet panel, for example within 4 degrees, 3 degrees, 2 degrees or 1 degree of the major axis.

The exit passages in the second region may be arranged to direct the bleed flow at an angle in the range of from 5 degrees to 40 degrees from the major axis of the bleed flow outlet, for example in the range of from 10 degrees to 35 degrees, for example in the range of from 15 degrees to 30 degrees, for example in the range of from 20 degrees to 25 degrees.

Each exit passage in the second region may be arranged to direct the bleed flow at substantially the same angle from the major axis as the other exit passages in the second region. The magnitude of the component of the bleed flow pointing towards the perimeter edge of the outlet panel may be the same for each exit passage in the second region in some arrangements.

The absolute direction of the bleed flow at exit from the exit passages may vary around the second region, for example depending on angular position around the major axis of the bleed flow outlet panel. Purely by way of example, the second region may extend around at least 180 degrees about the major axis, and the bleed flow through exit passages that are separated by 180 degrees may have components projected onto the plane of the outlet panel that are in opposite directions.

According to an aspect, there is provided a bleed flow discharge device for a turbofan gas turbine engine for bleeding flow from a core flow through the gas turbine engine into a bypass flow of the gas turbine engine. The bleed flow discharge device comprises a bleed flow duct through which, in use, the bleed flow taken from the core flow passes. The bleed flow discharge device comprises a bleed flow outlet panel as described and/or claimed herein positioned at the exit of the bleed flow duct, through which, in use, the bleed flow passes from the bleed flow discharge device into the bypass flow.

The second region of the bleed flow outlet panel may be generally downstream of the first region relative to the direction of the bypass flow in use.

The bleed flow discharge device may comprise one or more pressure reducing elements in the bleed flow duct. The pressure reducing element may comprise at least one flow contraction region and at least one flow expansion region arranged to reduce the total pressure of the bleed flow in the duct in use. Such a pressure reducing element may take any suitable form, such as a pepper pot.

According to an aspect, there is provided a method of manufacturing a bleed flow outlet panel or a bleed flow discharge device as described and/or claimed herein using additive layer manufacturing (ALM). Such additive layer manufacturing could be direct laser deposition (DLD). However, it will be appreciated that any suitable method may be used to manufacture a bleed flow outlet panel or bleed flow discharge device as described and/or claimed herein.

BRIEF DESCRIPTION OF THE DRAWINGS

Embodiments of the invention will now be described by way of example only, with reference to the accompanying diagrammatic drawings, in which.

DETAILED DESCRIPTION OF EMBODIMENTS

Figure 3:
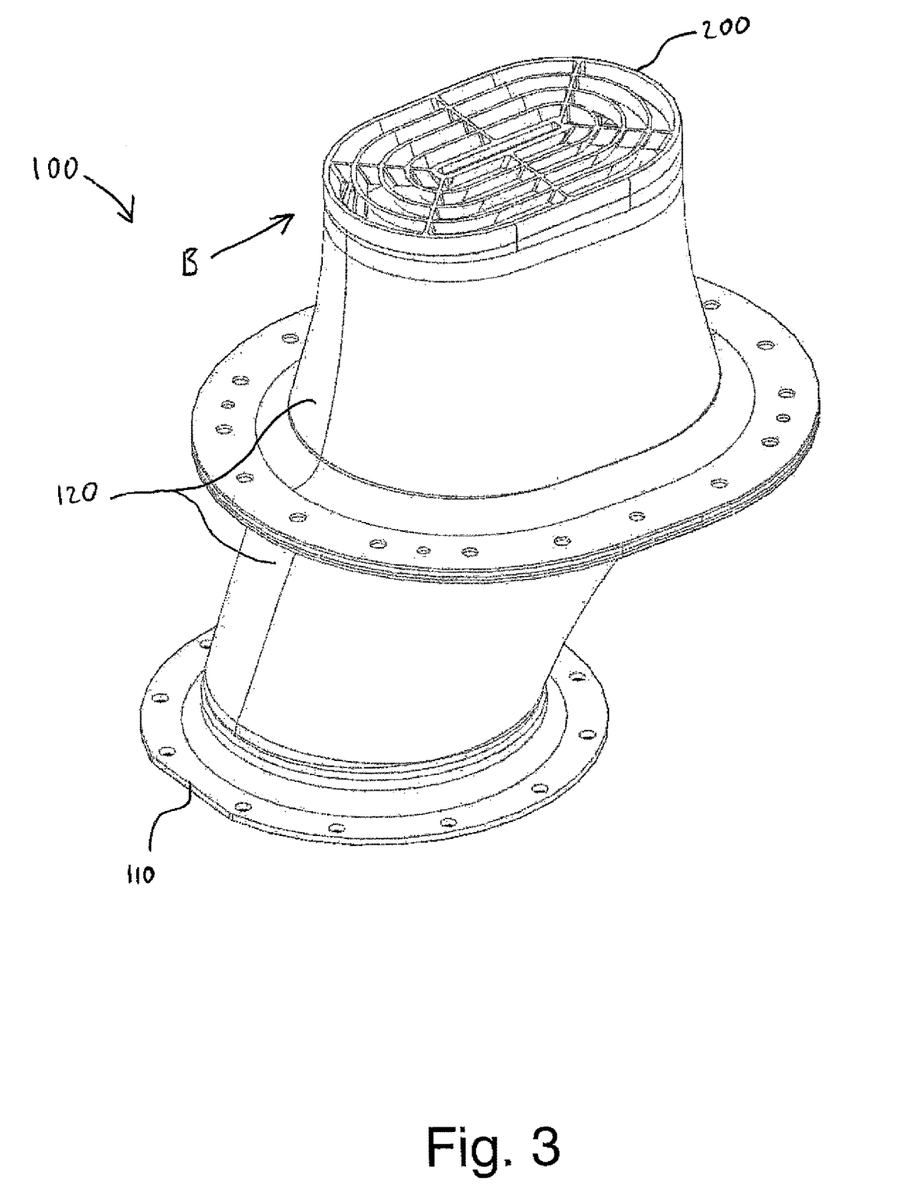
FIG. 3 is a schematic view of a bleed flow discharge device comprising a bleed flow outlet panel in accordance with an example of the invention.

FIG. 3 shows a bleed flow discharge device 100 according to an example of the invention for use with a gas turbine engine. The bleed flow discharge device 100 may be used, for example, to bleed flow from a compressor at certain operating conditions as described in more detail above in relation to the bleed assembly 30 shown in FIGS. 1 and 2. Indeed, the bleed flow discharge device 100 described herein in relation to FIGS. 3 to 7 may be used with any gas turbine engine, such as the gas turbine engine 10 shown in FIG. 1. Accordingly, the bleed flow discharge devices/bleed flow assemblies shown by way of example in FIG. 1 are labelled 30/100, to indicate that the gas turbine engine 10 of FIG. 1 may comprise a bleed flow discharge device 100 in accordance with the invention, and thus may itself be in accordance with the invention.

The bleed flow discharge device 100 shown in FIG. 3 may be used with a bleed valve (not shown in FIG. 3) to form a bleed assembly, which may itself be in accordance with the invention. The bleed flow discharge device 100 may be coupled at an upstream end (with respect to the bleed flow) to a bleed valve, for example at a mounting face 110 such as that shown in FIG. 3. Such a bleed valve may be in communication at one end with a respective compressor 14, 15 (as shown in FIG. 1) and with the bleed flow discharge device 100 at its other end. Also as described above in relation to FIGS. 1 and 2, in operation of the engine, part of the core engine air flow may be diverted through the bleed flow discharge device 100 by opening the bleed valve so that the bleed air flow passes from the respective compressors 14, 15 to be discharged into the bypass duct 22. By way of example, a bleed valve for use with the bleed flow discharge device 100 may be substantially the same as the bleed valve 34 described above in relation to FIG. 2.

The bleed flow discharge device 100 comprises a bleed flow duct 120 and a bleed flow outlet panel 200. In use, the bleed flow passes through the bleed flow duct 120 and is discharged from the bleed flow discharge device 100 through the bleed flow outlet panel 200, for example into the bypass flow B of a gas turbine engine 10. In the example shown in FIG. 3, the bleed flow duct 120 is shown as comprising two parts coupled together at a joint. However, it will be appreciated that the bleed flow duct 120, and indeed the bleed flow discharge device 100 as a whole, may be manufactured in any desired number of parts, including as a single piece.

Figure 4:
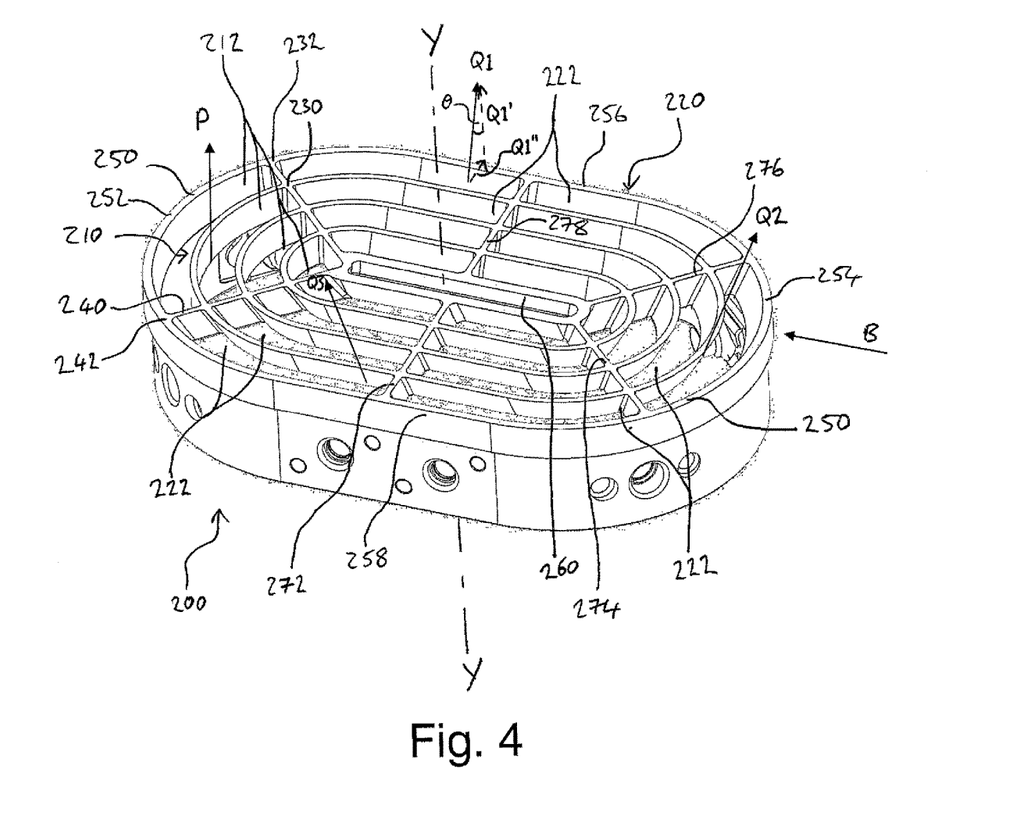
FIG. 4 is a schematic view of a bleed flow outlet panel in accordance with an example of the invention.

An example of the a bleed flow outlet panel 200 is shown in greater detail in FIG. 4. The bleed flow outlet panel of FIG. 4 is a substantially planar structure having its major plane perpendicular to a major axis Y-Y. When in use, the major axis Y-Y may be substantially aligned with the radial axis of a gas turbine engine 10, although this need not necessarily be the case.

The bleed flow outlet panel 200 comprises a first region 210 and a second region 220. The first region 210 and the second region 220 are separated from each other by a first wall 230 and a second wall 240. Each of the first wall 230 and the second wall 240 extends from a perimeter edge (which may be referred to as a perimeter edge wall) 250 to a centre (or centre region) 260 of the bleed flow outlet panel 200.

The first region 210 comprises exit passages 212 and the second region 220 comprises exit passages 222 (not all of the exit passages 222 of the second region 220 are labelled in FIG. 4 simply to improve the clarity of the Figure). In use, the bleed flow exits the bleed flow discharge device 100 through the exit passages 212, 222 in the bleed flow outlet panel 200.

The exit passages 212 of the first region 210 point in a direction P that is substantially parallel to the major axis Y-Y of the bleed flow outlet panel 200. As such, the bleed flow is discharged through the exit passages 212 of the bleed flow outlet panel 200 in a direction that is substantially parallel to the major axis Y-Y.

The exit passages 222 in the second region point in directions Q (Q1, Q2, Q3) that have a component that points towards the perimeter edge 250 (that is, the closest point on the perimeter edge 250 to the respective exit passage 222), and a component that points in the direction of the major axis Y-Y. As such, the bleed flow is discharged through the exit passages 222 of the bleed flow outlet panel 200 in directions Q that have a component that points towards the perimeter edge 250, and a component that points in the direction of the major axis Y-Y.

In FIG. 4, the flow through the exit passages 222 of the second region 220 is represented by arrows Q1, Q2, Q3. As illustrated in the FIG. 4 example, absolute direction Q1, Q2, Q3 of the flow passing through the exit passages 222 in the second region 220 may be different for different exit passages 222 depending on, for example, the direction to the closest point on the perimeter edge 250. Similarly, the absolute direction of the flow passing through an individual exit passage 222 of the second region 220 may be different at different points within that exit passage 222, for example if the individual exit passage has a curved shape in planview (that is, a curved shape when viewed from a direction aligned with the major axis Y-Y).

By way of illustration, the flow represented by the arrow Q1 in FIG. 4 is shown resolved into two mutually perpendicular components: a first component Q1' that is parallel to the major axis Y-Y of the bleed flow outlet panel 200; and a second component Q1" that points towards the locally closest point on the perimeter edge 250. The flow Q through the exit passages 222 of the second region 220 may be resolved entirely into these two mutually perpendicular directions, for example with no other components of the flow.

Any desired angle θ between the direction Q of the bleed flow exiting through the exit passages 222 of the second region 220 and the direction of the major axis Y-Y may be selected. For example, the angle θ may be in the range of from 5 degrees to 40 degrees, for example 10 degrees to 35 degrees, for example 15 degrees to 30 degrees, for example 20 degrees to 25 degrees. The precise angle θ may be chosen to suit a particular application.

A smaller angle θ may provide reduced blockage (i.e. a larger effective flow area). This may be beneficial in reducing the total area of the bleed flow outlet panel 200, and thus reducing the total area of the opening in the inner surface of the bypass duct required to house the bleed flow outlet panel

200. Thus may have aerodynamic and/or weight and/or structural benefits. Additionally or alternatively, a larger effective area may mean that the flow velocity is reduced for a given bleed flow mass flow rate. This may be advantageous in reducing the noise generated from the flow exiting from the bleed flow outlet panel 200 into the bypass flow B.

In some cases, having a larger angle θ (i.e. a larger component in the direction pointing towards the closest point on the perimeter edge 250) may result in better mixing of the bleed flow with the bypass flow B, although again this may be dependent on the geometry and/or application.

In some arrangements, the direction P of the bleed flow through the exit passages 212 of the first region 210 is not precisely parallel to the major axis Y-Y of the bleed flow outlet panel 200. For example, the direction P may be in the range of from +/−5 degrees of the direction of the major axis Y-Y.

In some arrangements, the direction P of the bleed flow through the exit passages 212 of the first region 210 may be simply described as being more closely aligned with the major axis Y-Y than is the direction(s) Q of the bleed flow through the exit passages 222 of the second region 220. The direction P of the bleed flow through the exit passages 212 of the first region 210 may have a greater component in the direction of the major axis Y-Y than the component of the bleed flow through the exit passages 222 of the second region in the direction of the major axis Y-Y.

Different exit passages 222 within the second region 220 may have the same or different angles θ between the flow direction Q and the direction of the major axis Y-Y. Accordingly, the bleed flow direction Q through a given exit passage 222 in the second region 220 may have the same or a different component pointing towards the locally closest point on the perimeter edge 250 to other exit passages 222 in the second region. For example, in certain applications, it may be desirable to have a different exit angle θ on opposite sides of the bleed flow exit panel 200 (thus, for example, in FIG. 4 the angles θ formed by the arrows Q1 and Q3 may be different) to avoid the relatively hot bleed flow impinging on a downstream feature in the bypass duct 22.

Figure 6:
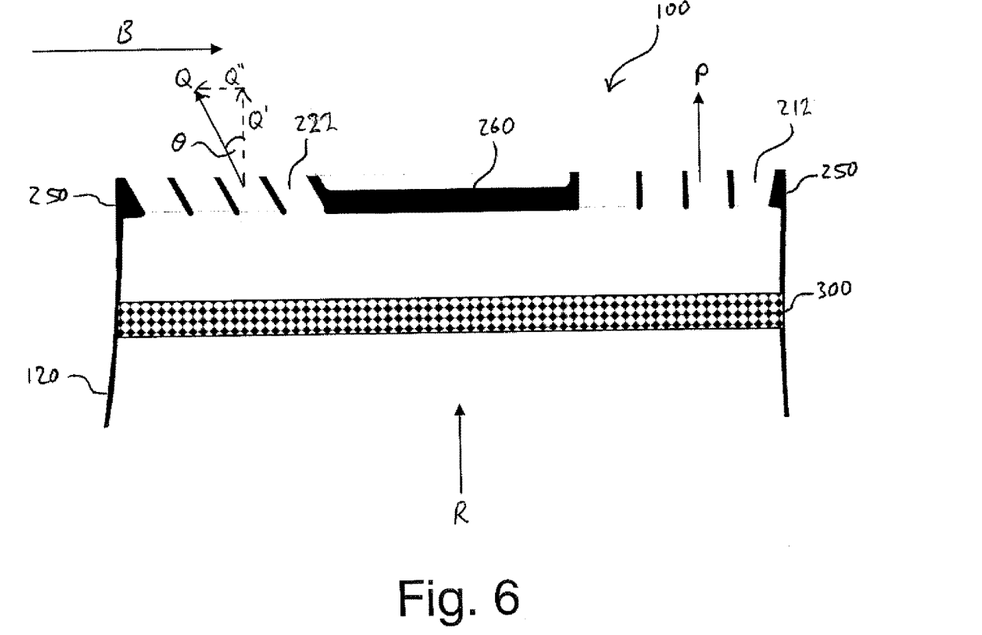
FIG. 6 is a cross-sectional view through part of a bleed flow discharge device according to an example of the invention, including a bleed flow outlet panel in accordance with an example of the invention.

As shown most clearly in FIGS. 4 and 6, the first region 210 (for example the centroid of the first region 210) may be downstream of the second region 220 (for example the centroid of the second region 220) relative to the bypass flow B into which the bleed flow is discharged through the exit passages 212, 222. As such, the bleed flow exiting in the direction P substantially parallel to (or more parallel to) the major axis Y-Y may be at the downstream side or region of the bleed flow outlet panel 200 relative to the bypass flow. This may reduce the likelihood of the bleed flow (for example a plume resulting from the bleed flow) attaching to the inner surface 27 of the bypass duct 22, thereby reducing the likelihood of thermal damage to the inner surface.

In the example shown in FIGS. 4 to 7, the perimeter edge 250 (and thus the planform shape) of the bleed flow outlet panel 200 is a stadium, or racetrack shape, i.e. it has two offset straight edges 256, 258 joined together by curves 252, 254 which, in the example of FIGS. 4 to 7 are semicircles. However, the perimeter edge 250 could have any desired shape. Purely by way of non-limitative example, the perimeter edge 250 could be a rounded rectangle, circle, rectangle, ellipse, oval or any other suitable shape, such as any suitable elongate shape.

Figure 5:
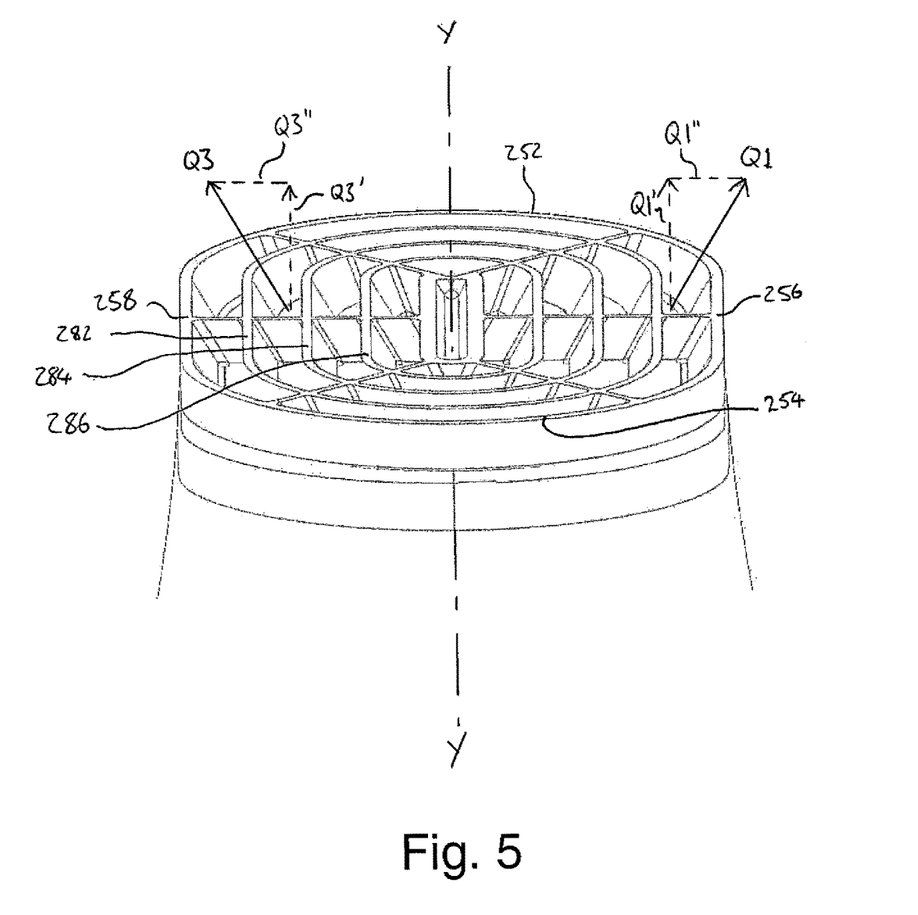
FIG. 5 is a different schematic view of the bleed flow outlet panel shown in FIG. 4.

In the example shown in FIGS. 4 and 5, the walls 240, 230 that separate the first region 210 from the second region 220 extend from points 232, 242 on the first semicircle 252 that joins the straight edges 256, 258. Again, the geometry of the bleed flow outlet panel 200 shown in FIGS. 4 to 6 is given by way of example only. Thus, for example, the dividing walls 230, 240 may extend from any desired position on the perimeter edge 250, for example any position on the first semicircle 252, including the endpoints thereof.

In the example shown in FIGS. 4 and 5, the area of the second region 220 is greater than the area of the first region 210. As such, in use most of the bleed flow will pass through the exit passages 222 of the second region 220. However, in other examples this need not be the case, and the area of the first region 210 may be greater than the area of the second region 220.

The second region 220 and/or the first region 210 may have one or more further walls extending from the perimeter edge 250 to the central region 260. A such, the second region 220 and/or the first region 210 may be said to be split into two or more sub-regions. In the example shown in FIGS. 4 and 5, the second region 220 is split into 5 sub-regions by four walls 272, 274, 276, 278. Such walls may at least in part define the exit passages 212, 222 and/or may provide rigidity to the bleed flow outlet panel 200.

The exit passages 212, 222 may be formed in any suitable manner. In the example shown in FIGS. 4 and 5, each exit passage 212, 222 is formed by two of the walls 230, 240, 272, 274, 276, 278 together with two of the perimeter wall 250 and offset walls 282, 284, 286 (see FIG. 5). In the FIGS. 4 and 5 example, the offset walls 282, 284, 286 are directly offset from the perimeter wall 250 in planview (i.e. when looking along the major axis Y-Y). However, in general a bleed flow outlet panel 200 may comprise any number of interior walls that are arranged in any suitable manner to define the exit passages 212, 222 in the desired form. In some arrangements, the walls that at least in part define the exit passages 212, 222 may be (or may be referred to) as vanes.

In some example, the bleed flow discharge device 100 may comprise one or more (for example one, two, three, four or more than four) pressure reducing elements. An example of such a pressure reducing element 300 is shown in cross-section in FIG. 6. A pressure reducing element 300 would typically be placed in bleed flow R upstream of the bleed flow outlet panel 200, as in the FIG. 6 example. The or each pressure reducing element 300 may be located between a bleed valve 34 and the bleed flow outlet panel 200. The or each pressure reducing element 300 is arranged to reduce the total pressure of the bleed flow R before it exits through the exit passages 212, 222. This reduction in total pressure means that the exit velocity through the exit passages 212, 222 into the bypass flow B is reduced, thereby reducing the noise generated by the bleed flow discharge device 100.

Such a pressure reducing device 300 may take any suitable form, for example any form which causes at least one flow area reduction followed by at least one expansion. The expansion is typically a rapid expansion, resulting in flow separation and unsteady mixing, and thus a reduction in total pressure. Purely by way of example, the pressure reducing device may be a pepper pot, that is a plurality of holes formed in a sheet. By way of clarification, the form of the pressure reducing device 300 shown in FIG. 6 is merely schematic.

Any method may be used to manufacture a bleed flow discharge device 100 and/or bleed flow outlet panel 200 according to the invention including, for example, casting or additive layer manufacture (ALM), such as direct laser deposition (DLD). Using ALM, it may be possible to generate the entire bleed flow outlet panel 200, or indeed the entire bleed flow discharge device (which may optionally include a pressure reducing element 300), as a single unit or part.

Figure 7:
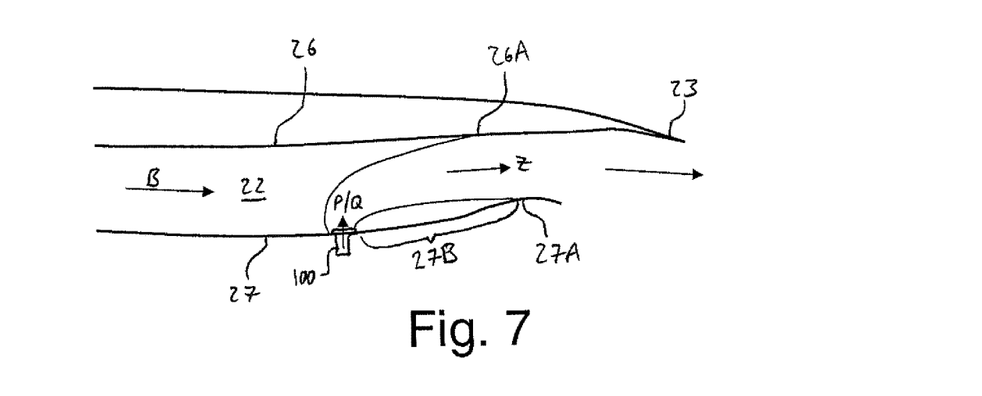
FIG. 7 is a cross-sectional schematic showing the path of a bleed flow plume in the bypass duct of a gas turbine engine after it is discharged through a bleed flow discharge device and bleed flow outlet panel in accordance with an example of the invention.

FIG. 7 shows a schematic of a bleed flow plume Z being discharged into the bypass duct 22 during operation of a bleed flow discharge device 100 according to an example of the invention. As shown in the FIG. 7, the bleed flow P/Q exits the bleed blow discharge device 100 into the bypass flow B, and does not impinge on the inner wall 27 until a point 27A significantly downstream of the bleed flow discharge device 100, indicated by the distance 27B in FIG. 7. This means that the relatively hot bleed flow Z has significantly mixed and cooled before impinging on the inner wall 27 of the bypass duct 22, thereby reducing the possibility of thermal damage and/or reducing the need for expensive and/or heavy thermal protection.

The distance 27B between the discharge of the bleed flow and impingement on the inner wall 27 may be increased over conventional arrangements at least in part due to the arrangement of the exit passages 212, 222 described and claimed herein. For example, the exit passages 222 in the second (downstream) region 220 may inhibit rapid attachment of the bleed flow P/Q onto the inner wall 27 by virtue of pointing the bleed flow in that region 220 substantially perpendicular to the bleed flow outlet panel 200, which may correspond to a direction that is substantially locally perpendicular to the inner wall 27 of the bypass duct 22 and/or to the bypass flow B.

The arrangement of the exit passages 212, 222 described and claimed herein may also promote good mixing of the bleed flow P/Q (and the resulting bleed flow plume Z) with the bleed flow 22 into which it exits. For example, the exit passages 212 of the first region that point the bleed flow Q at least in part towards the perimeter edge 250 of the outlet panel 200 may result in very rapid turning of the bleed flow, generating high levels of turbulence in the resulting plume Z, which promotes rapid mixing (and thus cooling) with the bypass flow before impingement on the inner wall 27 at position 27A or impingement on the outer wall 26 at position 26A. This rapid mixing may also be advantageous in arrangements where the gas turbine engine 10 is provided with a thrust reverser unit (not shown in the Figures), and the bleed flow would be directed through the thrust reverser unit (for example through a thrust reverser unit vane cascade) when deployed. In this case, rapid mixing may be beneficial to prevent thermal damage to the thrust reverser unit (for example to the vane cascade thereof).

Although the bleed flow outlet panel 200 and bleed flow discharge device 100 have been described herein in relation to discharging bleed flow into a bypass flow of a turbofan gas turbine engine, such a bleed flow outlet panel 200 and bleed flow discharge device 100 may also be used where a bleed flow exhausts overboard from an engine into an external flow. For example, in the case of a turboprop or open rotor engine a bleed flow may exhaust to atmospheric conditions external to the engine with the discharge device disclosed herein. Similarly, the present disclosure may be applied to a land based gas turbine, e.g. an aero-derivative or other gas turbine, for which a bypass duct may not be present and the bleed flow may be exhausted to atmospheric conditions. In other words, the discharge device of the present disclosure may exhaust into any flow field, including but not limited to discharge into a bypass duct.

It will be appreciated that many designs and/or arrangements of features, such as (by way of example only) the precise arrangement of exit passages 212, 222, and the shape of the perimeter edge 250 other than those shown in and described in relation to the Figures and not explicitly described herein fall within the scope of the invention. Furthermore, any feature described and/or claimed herein may be combined with any other compatible feature described in relation to the same or another embodiment.

I claim:

1. A bleed flow outlet panel for discharging bleed flow taken from a main flow through a gas turbine engine, the bleed flow outlet panel comprising:
    a perimeter edge formed around a major axis of the bleed flow outlet panel and defining its planform shape; and
    a plurality of exit passages, the exit passages being formed in at least two distinct regions of the bleed flow outlet panel, each region comprising a plurality of adjacent exit passages and at least two offset walls that are offset from the perimeter edge, wherein
    the exit passages in a first region are arranged to direct the bleed flow, in use, in a direction that has a greater component in the direction of the major axis than do the exit passages in a second region and
    each exit passage is defined at least in part by adjacent offset walls or by the perimeter edge and the offset wall immediately adjacent the perimeter edge.

2. The bleed flow outlet panel according to claim 1, wherein the first region is defined by a first angular segment of the bleed flow outlet panel, and the second region is defined by a second angular segment of the bleed flow outlet panel.

3. The bleed flow outlet panel according to claim 1, wherein all of the exit passages of the bleed flow outlet panel are formed in either the first region or the second region.

4. The bleed flow outlet panel according to claim 1, wherein the exit passages in the second region are arranged to direct the bleed flow, in use, in a direction that has a major component in the direction of the major axis of the bleed flow outlet panel.

5. The bleed flow outlet panel according to claim 1, wherein the bleed flow outlet panel comprises two walls that are spaced apart from each other and separate the first region from the second region.

6. The bleed flow outlet panel according to claim 1, wherein the perimeter edge of the bleed flow outlet panel comprises:
    a first curved portion that, in use, is positioned at a downstream end of the panel relative to a main flow into which the bleed flow exits; and
    a second curved portion that, in use, is positioned at an upstream end of the panel relative to a main flow into which the bleed flow exits, wherein
    the first region is defined at least in part by the first curved portion.

7. The bleed flow outlet panel according to claim 6, wherein:
    the perimeter edge of the bleed flow outlet panel is an elongate shape, having the first and second curved portions joined together by a first side edge and a second side edge; and
    the first region is defined by at least a part of the first curved portion and first and second dividing walls extending into the bleed flow outlet panel from first and second points on the first curved portion.

8. The bleed flow outlet panel according to claim 7, wherein the first and second dividing walls extend in a direction that is substantially perpendicular to the local perimeter edge.

9. The bleed flow outlet panel according to claim 1 having a generally planar shape defined perpendicular to the major axis.

10. The bleed flow outlet according to claim 1, wherein the total flow area of the exit passages in the second region is greater than the total flow area of the exit passages in the first region.

11. The bleed flow outlet panel according to claim 1, wherein the exit passages of the first region are arranged to direct the bleed flow within 5 degrees of the major axis of the bleed flow outlet panel.

12. The bleed flow outlet panel according to claim 1, wherein the exit passages in the second region are arranged to direct the bleed flow at an angle in the range of from 5 degrees to 40 degrees from the major axis of the bleed flow outlet.

13. The bleed flow outlet panel according to claim 1, wherein each exit passage in the second region is arranged to direct the bleed flow at substantially the same angle from the major axis as the other exit passages in the second region.

14. A bleed flow discharge device for a turbofan gas turbine engine for bleeding flow from a core flow through the gas turbine engine into a bypass flow of the gas turbine engine, the bleed flow discharge device comprising:
   a bleed flow duct through which, in use, the bleed flow taken from the core flow passes; and
   the bleed flow outlet panel according to claim 1 positioned at the exit of the bleed flow duct, through which, in use, the bleed flow passes from the bleed flow discharge device into the bypass flow.

15. The bleed flow discharge device for a turbofan gas turbine engine according to claim 14, wherein the second region of the bleed flow outlet panel is generally downstream of the first region relative to the direction of the bypass flow in use.

16. The bleed flow discharge device according to claim 14, further comprising a pressure reducing element in the bleed flow duct, the pressure reducing element comprising at least one flow contraction region and at least one flow expansion region arranged to reduce the total pressure of the bleed flow in the duct in use.

17. A method of manufacturing the bleed flow outlet panel according to claim 1 using additive layer manufacturing.

18. A method of manufacturing the bleed flow discharge device according to claim 14 using additive layer manufacturing.

19. A gas turbine engine comprising:
   an engine core through which core flow passes in use;
   a bypass duct arranged around the engine core and through which bypass flow passes in use;
   a bleed valve in communication with the core flow and arranged to be selectively openable to allow bleed flow to be bled from the core flow; and
   a bleed flow discharge device in communication with the bleed valve and arranged to discharge the bleed flow into the bypass flow, the bleed flow discharge device comprising:
   a bleed flow duct through which, in use, the bleed flow taken from the core flow through the bleed valve passes; and
   a bleed flow outlet panel through which, in use, the bleed flow passes from the bleed flow discharge device into the bypass flow, the bleed flow outlet panel comprising:
   a perimeter edge formed around a major axis of the bleed flow outlet panel and defining its planform shape; and
   a plurality of exit passages, the exit passages being formed in at least two distinct regions of the bleed flow outlet panel, each region comprising a plurality of adjacent exit passages, wherein
   the exit passages in a first region are arranged to direct the bleed flow, in use, in a direction that has a greater component in the direction of the major axis than do the exit passages in a second region,
   each region comprises at least two offset walls that are offset from the perimeter edge, and
   each exit passage is defined at least in part by adjacent offset walls or by the perimeter edge and the offset wall immediately adjacent the perimeter edge.

\* \* \* \* \*